United States Patent
Kondou et al.

(10) Patent No.: US 6,935,657 B2
(45) Date of Patent: Aug. 30, 2005

(54) STEERING SHAFT FOR ENERGY ABSORBING STEERING COLUMN AND MANUFACTURING METHOD THEREOF

(75) Inventors: Akira Kondou, Shizuoka (JP); Mitsuji Yamamura, Shizuoka (JP)

(73) Assignee: Fuji Kiko Co., Ltd., Kasai (JP)

( * ) Notice: Subject to any disclaimer, the term of this patent is extended or adjusted under 35 U.S.C. 154(b) by 95 days.

(21) Appl. No.: 10/023,795

(22) Filed: Dec. 21, 2001

(65) Prior Publication Data

US 2002/0079686 A1 Jun. 27, 2002

(30) Foreign Application Priority Data

Dec. 27, 2000 (JP) .......................... 2000-398050
Feb. 28, 2001 (JP) .......................... 2001-054171

(51) Int. Cl.$^7$ ................................. B62D 1/11
(52) U.S. Cl. ....................................... 280/777
(58) Field of Search ................ 280/777; 74/492; 188/371, 374; 29/516, 517; 464/179, 183, 30; 403/359, 298

(56) References Cited

U.S. PATENT DOCUMENTS

| 4,572,022 A | * | 2/1986 | Mettler ........................ 74/492 |
| 4,991,871 A | * | 2/1991 | Sadakata ..................... 280/777 |
| 5,314,204 A | * | 5/1994 | DuRocher et al. .......... 280/777 |
| 5,613,794 A | * | 3/1997 | Isaac et al. .................. 403/265 |
| 5,954,362 A |   | 9/1999 | Aota et al. ................... 280/777 |
| 6,068,296 A |   | 5/2000 | Tomaru et al. .............. 280/777 |

FOREIGN PATENT DOCUMENTS

| JP | 56-36572   | 4/1981  |
| JP | 58-142178  | 9/1983  |
| JP | 59-77965   | 5/1984  |
| JP | 5-37642    | 5/1993  |
| JP | 5-178221   | 7/1993  |
| JP | 9-48353    | 2/1997  |
| JP | 9-272447   | 10/1997 |
| JP | 10-16795   | 1/1998  |
| JP | 10-45005   | 2/1998  |
| JP | 10-147245  | 6/1998  |
| JP | 10-203381  | 8/1998  |
| JP | 11-291923  | 10/1999 |

* cited by examiner

Primary Examiner—Faye M. Fleming
(74) Attorney, Agent, or Firm—Foley & Lardner LLP

(57) ABSTRACT

A steering shaft for an energy absorbing steering column includes a lower shaft, an upper shaft fitted therein, and a projection formed with the lower shaft at a predetermined spot and protruding inwardly from the inner surface of the lower shaft.

4 Claims, 3 Drawing Sheets

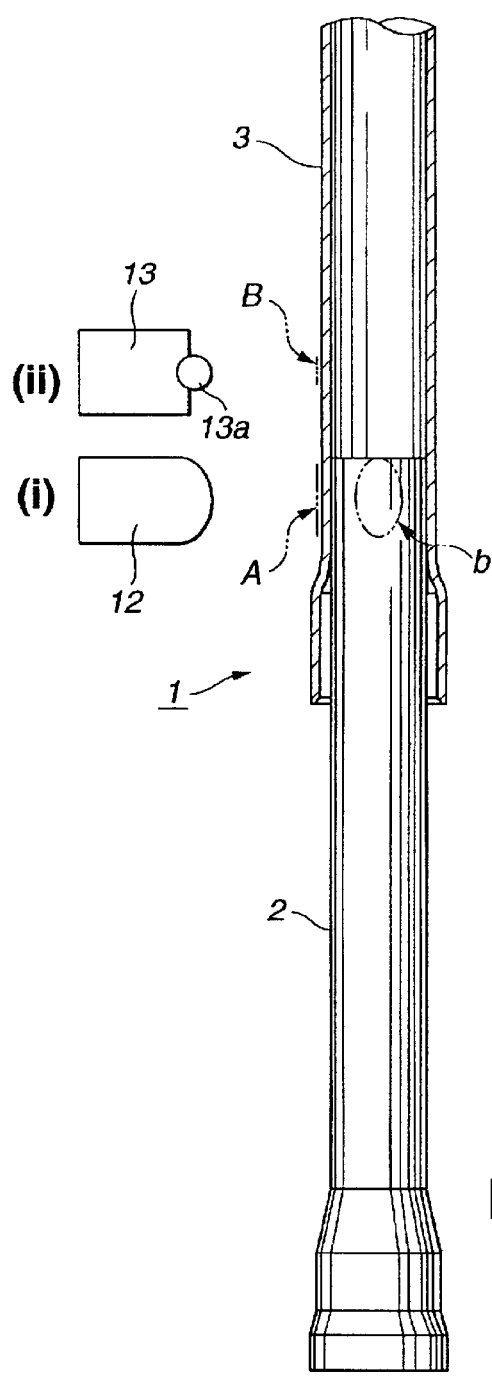
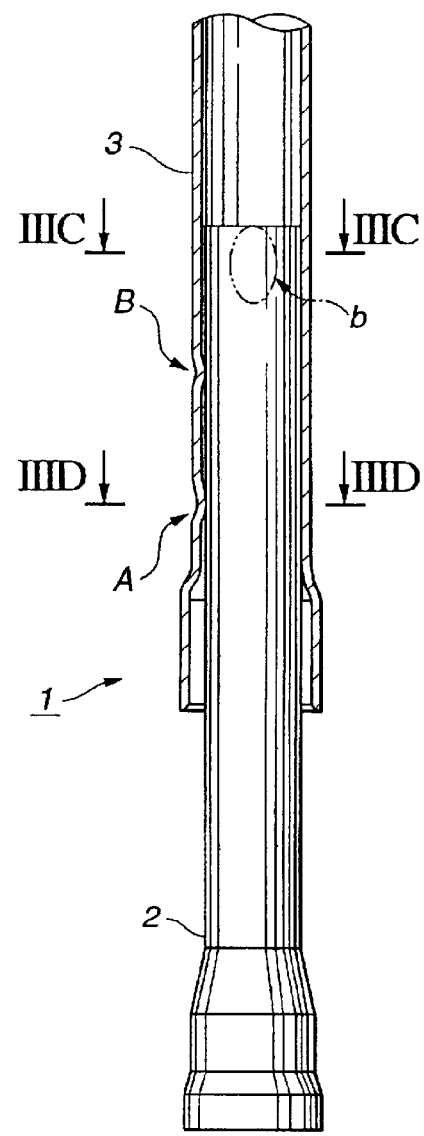
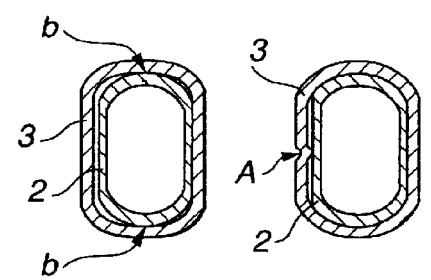

STEERING SHAFT FOR ENERGY ABSORBING STEERING COLUMN AND MANUFACTURING METHOD THEREOF

BACKGROUND OF THE INVENTION

The present invention relates to steering shafts for impact-energy absorbing steering columns and a manufacturing method thereof. More particularly, the present invention relates to an improvement in engagements such as serration for providing steering shafts that are contractible for impact-energy absorption.

JP-A 948353 shows a steering shaft comprising a hollow lower shaft and a hollow upper shaft integrated with each other. A circumferential groove is formed in the outer peripheral surface of the lower shaft, whereas a hole is formed in the upper shaft. The groove and the hole are filled with a resin.

In the event of vehicle collision, a secondary collision will occur which a driver collides with a steering wheel by law of inertia. This produces a great impact load applied axially to the upper shaft. Thus, the upper shaft is moved downward with respect to the lower shaft, providing a shearing force to the resin. When a load applied to the upper shaft exceeds a maximum shearing stress for the resin, the resin is sheared to allow movement of the upper shaft toward the lower shaft. This movement contributes to absorption of an impact of the upper shaft applied to the driver.

However, the above steering shaft needs machining of the lower and upper shafts and injection of the resin, leading to high manufacturing cost. Moreover, variations between products often occur due to individual difference, which causes increased number of processes for control of the resin-injection pressure, clamping pressure, etc., resulting in high manufacturing cost.

SUMMARY OF THE INVENTION

It is, therefore, an object of the present invention to provide steering shafts for impact-energy absorbing steering columns, which allow a reduction in manufacturing cost with simplified production process. Another object of the present invention is to provide a manufacturing method of such steering shafts.

The present invention generally provides a steering shaft for an energy absorbing steering column, which comprises a first shaft; a second shaft fitted in the first shaft; and a projection formed with the first shaft at a predetermined spot, wherein the projection protrudes inwardly from an inner surface of the first shaft.

A main feature of the present invention is to provide a method of manufacturing such steering shaft, which comprises preparing first and second shafts; fitting the second shaft into the first shaft; pressing the shafts at a predetermined spot, the shafts pressing creating a projection on the first shaft, wherein the projection protrudes inwardly from an inner surface of the first shaft; and moving the first shaft and the second shaft in a relative manner in a direction of energy absorbing motion.

BRIEF DESCRIPTION OF THE DRAWINGS

The other objects and features of the present invention will become apparent from the following description with reference to the accompanying drawings, wherein:

FIG. 3A is a longitudinal section showing a second embodiment of the present invention;

FIG. 3B is a view similar to FIG. 3A, showing the steering shaft with a lower shaft press-fitted into an upper shaft up to a predetermined position;

FIG. 3C is a view similar to FIG. 2C, taken along the line IIIC—IIIC in FIG. 3B; and FIG. 3D is a view similar to FIG. 3C, taken along the line IIID—IIID in FIG. 3B.

DETAILED DESCRIPTION OF THE INVENTION

Figure 1A:
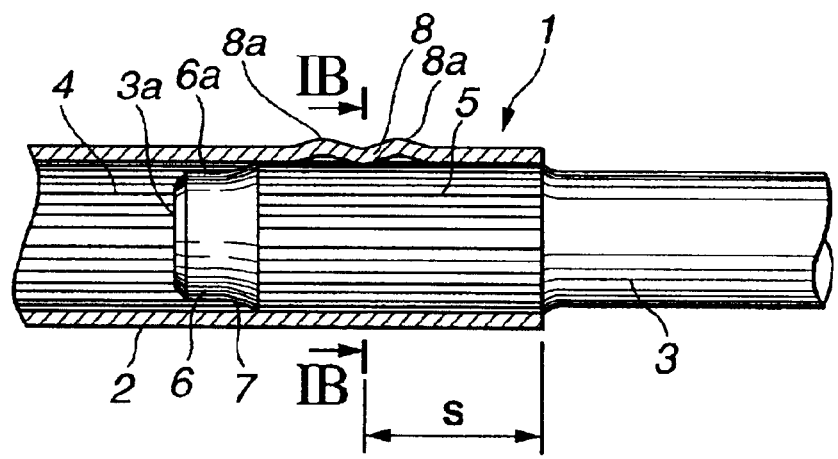
FIG. 1A is a fragmentary longitudinal section showing a first embodiment of a steering shaft according to the present invention.

Referring to the drawings, a description will be made with regard to a steering shaft for impact-energy absorbing steering columns embodying the present invention.

Figure 1B:
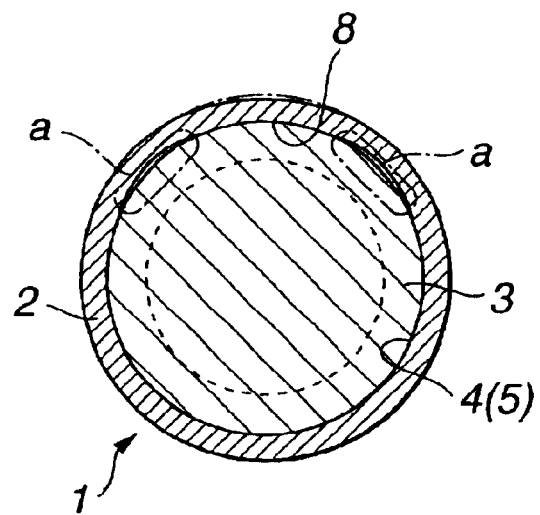
FIG. 1B is a cross section taken along the line IB—IB in FIG. 1A.

Referring to FIGS. 1A–1B, a steering shaft 1 comprises a hollow lower shaft 2 and a solid upper shaft 3. The lower shaft 2 is formed with a female serration or engaging recess 4, and the upper shaft 3 is formed with a male serration or engaging protrusion 5. The lower and upper shafts 2, 3 are relatively slidably connected by means of engagement of the female serration 4 with the male serration 5, providing the steering shaft 1 that is contractible for impact-energy absorption. A steering wheel is mounted to the upper shaft 3 at an end thereof, not shown.

The lower shaft 2 does not need to be hollow throughout the length, but may be hollowed at least in a portion for the female serration 4. The female and male serrations 4, 5 are obtained according to known machining methods such as drawing and rolling.

A shank 6 is integrally formed with the upper shaft 3 at an end thereof to provide a non-serration area adjacent to an end or front edge of the male serration 5. The shank 6 having smaller diameter than the maximum diameter of the male serration 5 extends from the end of the male serration 5 to an end face 3a of the upper shaft 3. In order to prevent a level differential due to diameter difference from occurring at the boundary between the shank 6 and the male serration 5, the shank 6 is formed with an R-chamfered portion 7 to smoothly connect the two. The shank 6 is also formed with a straight portion 6a extending to the end face 3a. Such structures contribute to stabilization of the contour accuracy of a depression 8 as will be described later, resulting in stabilized press-fit load for the lower and upper shafts 2, 3 without any variation. It is noted that the shank 6 is formed concurrently when working the upper shaft 3 by cold forging, for example.

On the other hand, the depression 8 is formed with the lower shaft 2 to correspond to the male serration 5 of the upper shaft 3 in the normal serration engagement of the two shafts 2, 3. The depression 8 is obtained by thrusting inwardly an axial portion of the lower shaft 2 with female serration 4. The depression 8 serves to locally reduce the inner diameter of the female serration 4 of the lower shaft 2.

Thus, when the female and male serrations 4, 5 are in engagement, the depression 8 comes in intense press contact with the male serration 5 to increase the slide resistance between the two.

Specifically, when the female and male serrations 4, 5 are in engagement as shown in FIG. 1A, the depression 8 is deformed outwardly resiliently with two swellings 8a created on both side, coming in press contact with the male serration 5. A distance S from a press-contact position of the depression 8 to another end or rear edge of the male serration 5 serves as an impact-energy absorbing stroke. The impact-energy absorbing stroke S can be determined optionally in accordance with the specifications, required impact-energy absorbing characteristics, etc. of the steering shaft 1. The slide resistance resulting from the depression 8 can be controlled by adjusting the inward protrusion amount thereof.

Therefore, during steering operation, the steering shaft 1 having the above structure allows torque transfer through engagement of the female and male serrations 4, 5. On the other hand, when undergoing an impact energy to the extent of contracting the steering shaft 1 by a secondary collision of a driver, etc., the steering shaft 1 is contracted by slide movement of the upper shaft 3 with respect to the lower shaft 2 through engagement of the female and male serrations 4, 5.

In the illustrative embodiment, required impact-energy absorbing stroke can be obtained by the lower shaft 2 with depression 8 and the upper shaft 3 with small-diameter shank 6 only, resulting in a reduction in number of parts and working processes, and thus in manufacturing cost.

It is noted that serration engagement of the lower and upper shafts 2, 3 may be replaced with spline engagement, and that the chamfered portion 7 may be of the tapered shape in place of the R-shape. Moreover, the small-diameter shank 6 may be formed with a male serration, since the shank 6 and the R-chamfered portion 7 are formed with a male serration when concurrently shaping the male serration 5 and the shank 6 by one process of cold forging, for example.

Referring to FIGS. 2A–2D, the process of creating the depression 8 in the lower shaft 2 will be described.

Figure 2A:
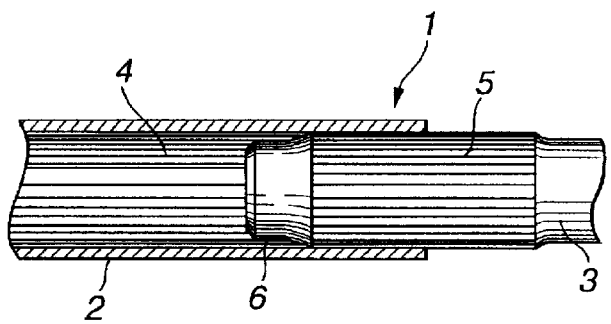
FIG. 2A is a view similar to FIG. 1A, showing the steering shaft before creating a depression.

Referring to FIG. 2A, the lower shaft 2 with preformed female serration 4 is engaged with the upper shaft 3 with preformed male serration 5 and small-diameter shank 6 so that the shank 6 of the upper shaft 3 corresponds to a given position of the lower shaft 2 where the depression 8 is to be created.

Figure 2B:
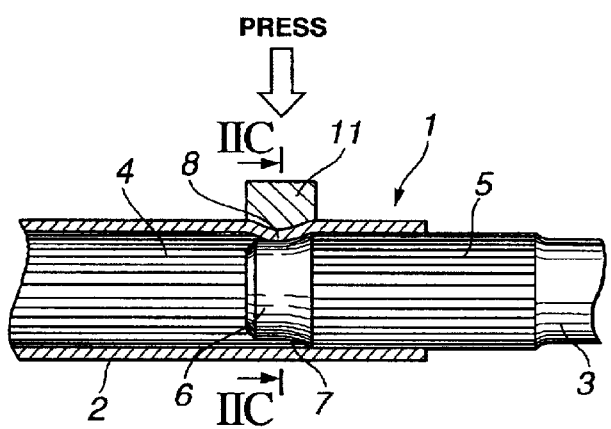
FIG. 2B is a view similar to FIG. 2A, showing the steering shaft when creating the depression.
Figure 2C:
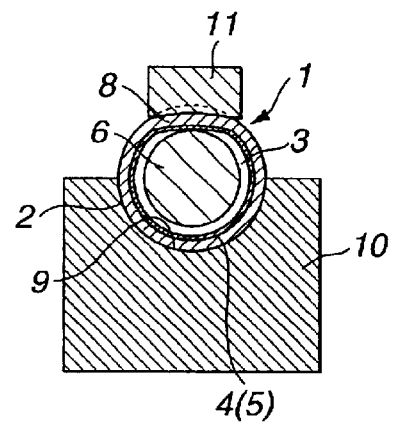
FIG. 2C is a view similar to FIG. 1B, taken along the line IIC—IIC in FIG. 2B.

Referring to FIGS. 2B–2C, the steering shaft 1 having lower and upper shafts 2, 3 in serration engagement is positioned on a pressure jig 10 with semicylindrical bearing surface 9. Then, using effectively the shank 6 as a mandrel, a predetermined pressure is provided to the given portion of the lower shaft 2 by a punch 11 so as to create the depression 8 along the shape of shank 6 or the R-chamfered portion 7.

Figure 2D:
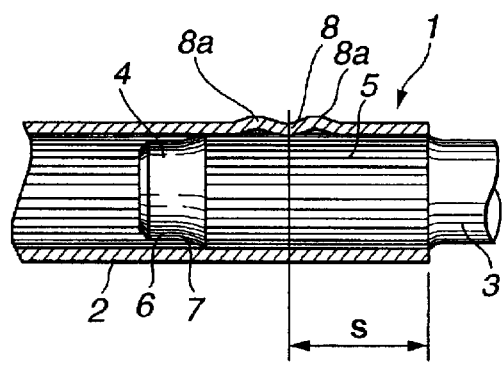
FIG. 2D is a view similar to FIG. 2B, showing the steering shaft when the depression is in press contact with a male serration.

Subsequently, referring to FIG. 2D, the lower shaft 2 is moved slidingly with respect to the upper shaft 3. The relative slide-movement amount is adjusted so that the depression 8 comes out of the small-diameter shank 6 to be in press contact with the male serration 5, and the distance S from the press-contact position of the depression 8 to another end of the male serration 5 serves as impact-energy absorbing stroke. Specifically, when disengaging from the shank 6 and the R-chamfered portion 7, the depression 8 is deformed outwardly resiliently with two swellings 8a created on both side, coming in press contact with the male serration 5. Thus, the steering shaft 1 is obtained as shown in FIG. 1A.

As shown in FIG. 1B, a slight clearance is produced in specific portions "a" of an engagement of the female and male serrations 4, 5, which raises no functional inconvenience.

FIGS. 3A–3D show a second embodiment of the present invention. Referring to FIGS. 3A and 3C, the steering shaft 1 comprises a hollow lower shaft 2 having a modified cross section with two plane portions and two circular portions, and a hollow upper shaft 3 having the same modified cross section. In order to increase the frictional resistance between the lower and upper shafts 2, 3 in engagement, convexes A, B and expansions "b, b" are formed with the steering shaft 1. Specifically, a position (i) of the steering shaft 1 as shown in FIG. 3A is pressed by a punch 12 having a semispherical head. The head of the punch 12 is driven into the upper shaft 3 to create on the upper shaft 3 an inwardly protruding spot or first convex A, and on the lower shaft 2 a pair of expansions "b, b" developing outwardly in the direction at right angles to the driven direction, i.e. in the vertical direction as viewed in FIG. 3C.

Then, a position (ii) of the steering shaft 1 as shown in FIG. 3A is pressed by a punch 13 having a head with a steel ball 13a. The steel ball 13a of the punch 13 is driven into the upper shaft 3 to create on the upper shaft 3 an inwardly protruding spot or second convex B. Since the lower shaft 2 does not exist at a position B, no expansion is created on the lower shaft 2.

After creating the convexes A, B, the lower shat 2 is further inserted into the upper shaft 3 as shown in FIG. 3B. Referring to FIGS. 3C–3D, due to presence of the convexes A, B protruding inwardly from the upper shaft 3 and the expansions "b, b" developing outwardly from the lower shaft 2, the frictional resistance is greater between the lower and upper shafts 2, 3, obtaining press-fitted lower shaft 2. Measuring and recording a press-fit load for the lower and upper shafts 2, 3 allows total on-line control of the steering shaft 1.

Press fit of the lower shaft 2 is achieved as shown in FIG. 3B. The frictional resistance between the lower and upper shafts 2, 3 is increased due to presence of four spots, i.e. two convexes A, B of the lower shaft 2 and two expansions "b, b" of the upper shaft 3. The lower and upper shafts 2, 3 are in press contact with each other at the first convex A and the expansions "b" shown in FIG. 3B, and also at the second convex B located therebetween, obtaining sufficiently high strength of the steering shaft 1 with respect to a bending moment.

In the event that a secondary collision occurs which a driver collides with a steering wheel due to vehicle collision, a compressive force is applied to the steering shaft 1. Specifically, referring to FIG. 3B, the upper shaft 3 is pressed downward with respect to the lower shaft 2. At that time, greater frictional resistance is produced between the lower and upper shafts 2, 3 at the convexes A, B and the expansions "b, b". Thus, in absorbing a pressing force applied to the upper shaft 3 by the driver, the upper shaft 3 is slid downwardly along the lower shaft 2 to achieve shorter length.

In the second embodiment, the punch 12 is applied once to obtain single combination of the first convex A and the expansions "b, b", and the punch 13 is applied once to create single second convex B. Optionally, the punch 12 may be applied twice or more to obtain two or more combinations thereof. And the punch 13 may be applied twice or more to create two or more second convexes B, or it may not be applied at all to create no convex.

Moreover, in the embodiment, the lower shaft 2 is fitted in the upper shaft 3. Optionally, the upper shaft may be fitted in the lower shaft. Further, in the embodiments, the lower and upper shafts 2, 3 are of a modified cross section with two plane portions and two circular portions. Alternatively, the lower and upper shafts may be of a polygonal cross section.

Having described the present invention with regard to the preferred embodiment, it is noted that the present invention is not limited thereto, and various changes and modifications can be made without departing from the scope of the present invention.

The entire teachings of Japanese Patent Application 2000-398050 filed Dec. 27, 2000 and Japanese Patent Application 2001-54171 filed Feb. 28, 2001 are incorporated hereby by reference.

What is claimed is:

1. A steering shaft for an energy absorbing steering column, comprising:
   a first hollow shaft;
   a second hollow shaft fitted in the first shaft;
   a first convex formed on the first shaft at a first predetermined spot, wherein the first convex protrudes inwardly from an inner surface of the first shaft;
   a pair of expansions formed on the second shaft, wherein the pair of expansions develops from an outer surface of the second shaft in a direction substantially perpendicular with respect to that of the first convex.

2. The steering shaft as claimed in claim 1, further comprising a second convex formed on the first shaft at a second predetermined spot, wherein the second convex protrudes inwardly from the inner surface of the first shaft.

3. A steering shaft for an energy absorbing steering column, comprising:
   a first shaft;
   a second shaft having an end fitted in the first shaft;
   a projection formed with the first shaft at a predetermined spot, the projection protruding inwardly from an inner surface of the first shaft;
   a shank having an end disposed adjacent to the end of the second shaft and another end being free, the shank having a smaller diameter than a maximum diameter of the end of the second shaft; and
   R-chamfered and straight portions formed with the shank, the R-chamfered and straight portions being continuously connected to each other, the R-chamfered portion being located at the end of the shank.

4. A steering shaft for an energy absorbing steering column, comprising:
   a first shaft comprising an engaging recess on an inner peripheral surface;
   a second shaft comprising an engaging protrusion on an outer peripheral surface in an end portion, the end portion being filled in the first shaft;
   a shank having an end disposed adjacent to the end portion of the second shaft and another end being free, the shank having a smaller diameter than a maximum diameter of the end portion of the second shaft;
   R-chamfered and straight portions formed with the shank, the R-chamfered and straight portions being continuously connected to each other, the R-chamfered portion being located at the end of the shank; and
   a depression formed with the first shaft, the depression being in press contact with the engaging protrusion of the second shaft, wherein a distance between the depression and a base end of the engaging protrusion forms a predetermined impact-energy absorbing stroke.

* * * * *